US007089394B2

(12) United States Patent
Royer, Jr.

(10) Patent No.: US 7,089,394 B2
(45) Date of Patent: Aug. 8, 2006

(54) OPTIMALLY MAPPING A MEMORY DEVICE

(75) Inventor: Robert J. Royer, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 10/420,122

(22) Filed: Apr. 22, 2003

(65) Prior Publication Data

US 2004/0215923 A1    Oct. 28, 2004

(51) Int. Cl.
*G06F 12/08*    (2006.01)
(52) U.S. Cl. .................. 711/201; 711/113; 711/202; 711/138
(58) Field of Classification Search ............ None
See application file for complete search history.

(56) References Cited

U.S. PATENT DOCUMENTS 5,606,687 A * 2/1997 Mehring et al. ............ 711/139
5,903,917 A * 5/1999 Douceur et al. ............ 711/201
6,125,435 A * 9/2000 Estakhri et al. ............. 711/201
6,129,458 A * 10/2000 Waters et al. ............... 711/133
6,160,562 A * 12/2000 Chin et al. .................. 345/520
6,434,663 B1 * 8/2002 Grimsrud et al. ........... 711/111
6,732,248 B1 * 5/2004 Chang et al. ............... 711/201
2003/0177330 A1* 9/2003 Idei et al. ................... 711/202
2004/0148360 A1* 7/2004 Mehra et al. ............... 709/212

OTHER PUBLICATIONS

Andrew S. Tanenbaum Albert S. Woodhull□□Operating Systems: Design and Implemention□□Second Edition□□1997□□p. 319-337□□.*
Microsoft Computer Dictionary□□Fifth Edition□□2002□□p. 165, 438.*

* cited by examiner

Primary Examiner—Reginald G. Bragdon
Assistant Examiner—Shawn Gu
(74) Attorney, Agent, or Firm—Trop, Pruner & Hu, P.C.

(57) ABSTRACT

In one embodiment of the present invention, a method includes observing disk requests for a drive associated with a memory device; and mapping the memory device based on observing the disk requests.

22 Claims, 4 Drawing Sheets

OPTIMALLY MAPPING A MEMORY DEVICE

BACKGROUND

Block-alterable memories, such as flash memories or polymer ferroelectric random access memories (PFRAMs), are used in many different applications. Flash memory is a high-speed electrically erasable programmable read-only memory (EEPROM) in which erasing and programming (i.e., writing) is performed on blocks of data. One use of a flash memory or a PFRAM is as a cache media, such as a disk cache for a disk device such as a disk drive, to act as a temporary storage area for frequently accessed data. The media's access characteristic for each data request cycle (read or write) is an initial latency before all the data in the block or wordline is available from the media. Each wordline contains the physical amount of data that can be transferred per memory cycle and can contain several kilobytes (KB) of data.

Disk drives can only uniquely address 512 byte blocks of data at a time, commonly called a disk sector; accordingly, a disk cache typically maintains the same addressing granularity. Thus multiple addressable 'disk sectors' are stored on each wordline of a cache along with some cache metadata. File systems typically request multiple disk sectors per each input/output (I/O) request, as multiple disk sectors are addressed as one file system cluster, normally in even sector increments, to minimize overhead in disk organization. Unfortunately, the first file system cluster does not start at sector zero on the disk drive but at an arbitrary sector offset. Thus additional cache wordlines are accessed if the mapping of disk to cache address does not naturally align to operating system (OS) file system clusters. Thus a need exists to reduce the number of wordline accesses per disk request or other memory request.

DETAILED DESCRIPTION

Figure 1:
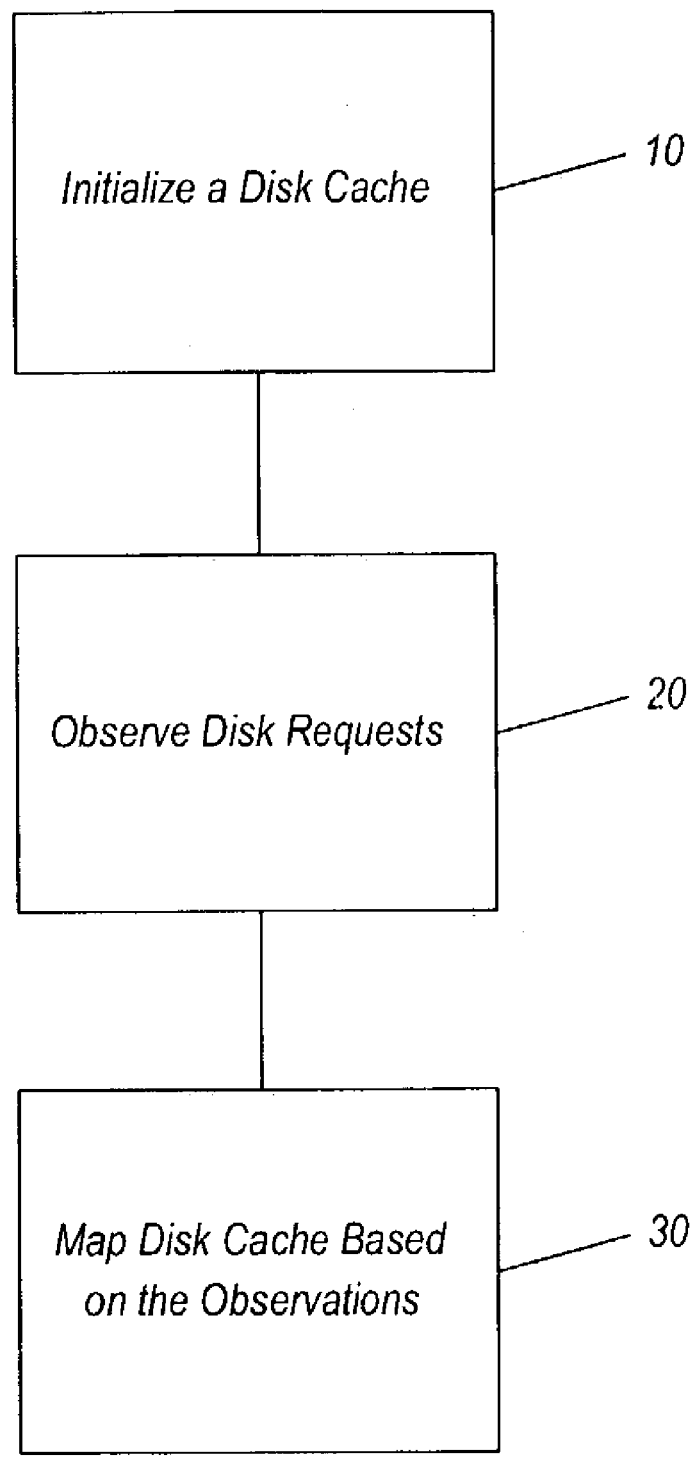
FIG. 1 is a flow diagram of a method in accordance with one embodiment of the present invention.

Referring now to FIG. 1, shown is a flow diagram of a method in accordance with one embodiment of the present invention. As shown in FIG. 1, the method may begin by initializing a disk cache (block 10). While such initializing may vary in different embodiments, in one embodiment the initializing may include resetting the disk cache and flushing all user data and organization information from the cache media and policy. During initialization in one embodiment, all information about cache mapping is cleared and a cache policy is changed to a no caching policy until the mapping is established.

In certain embodiments, during initialization an array of all possible offsets into a cache cacheline may be set. A cacheline is one or more whole multiples of wordlines and may be sized in a manner to ensure that the average OS disk request is a whole multiple of cacheline size. Herein the terms "cacheline" and "wordline" may be used interchangeably. The offset array (e.g., a "CachelineAdjustArray") may be set in system memory. In one embodiment, the number of offsets in the array may be selected to be the number of disk sectors per wordline for the disk cache. For example, for a disk cache having 8 KB per wordline, 16 disk sectors may be stored per wordline. Thus in such an embodiment, the offset array may have 16 entries to represent the 16 disk sectors.

Referring again to FIG. 1, next a number of disk requests may be observed (block 20). In one embodiment, such disk requests may be observed using a disk cache driver of an OS or via another OS-defined manner. However, in other embodiments the disk requests may be observed at other locations, such as on the disk cache itself. While the number of disk requests may vary substantially, in certain embodiments between approximately 50 and 200 requests may be observed, and in one embodiment approximately 100 requests may be observed.

In various embodiments, for each OS disk request an offset into each cacheline may be identified, assuming a temporary mapping of disk address zero equal to cache address zero (wrapping disk address as needed). Next, the count in the offset array for the identified offset may be incremented. To ensure a good mapping, in certain embodiments only requests that are a cacheline size or larger may be calculated, as anything smaller is not indicative of normal operation. After the offset calculations are done, the OS disk request may then be issued to the disk to service the request.

After a suitable number of disk requests are observed for desired information, the disk cache may be mapped based on the observations (block 30). For example, the disk cache may be mapped to choose the optimal disk address to wordline offset mapping based on the frequency of counts in the offset array. That is, the offset array may be examined to determine what offset into the cacheline has the largest number of hits or occurrences. This offset may become the new sector zero in each cacheline to disk address mapping, and may be stored in the cache media for future reference. In other words, the disk cache may be mapped to align disk requests to a wordline boundary. After such mapping, average disk requests will access the disk cache beginning at a wordline boundary.

Due to the nature of a file system, once a mapping is chosen to minimize the number of cache requests it typically holds true for the average disk request for the life of that file system. However, depending on what file system a user wants to install or even how the user installs the file system onto the hard disk, this mapping may change. A change in mapping may also occur when a user installs a new file system on his drive or even re-installs or updates the same file system on the drive, or formats or re-formats the drive. In other embodiments, if a more dynamic file system is used, mapping a disk cache or other memory device may be performed upon each boot of a system.

In certain embodiments, the most optimal disk address to wordline offset mapping-method may be automatically determined dynamically, and may be performed in a user transparent manner to adapt the cache mapping for optimal performance. That is, a mapping may be determined to allow the minimal number of cacheline accesses to retrieve the data thus providing the best performance.

While discussed in connection with disk caching, it is to be understood that methods in accordance with other embodiments of the present invention may be used for optimization of any non-volatile storage device, such as where a flash memory or PFRAM is used for primary storage. In such embodiments, the memory device may be mapped to align memory requests to a wordline boundary of the memory device.

Figure 2:
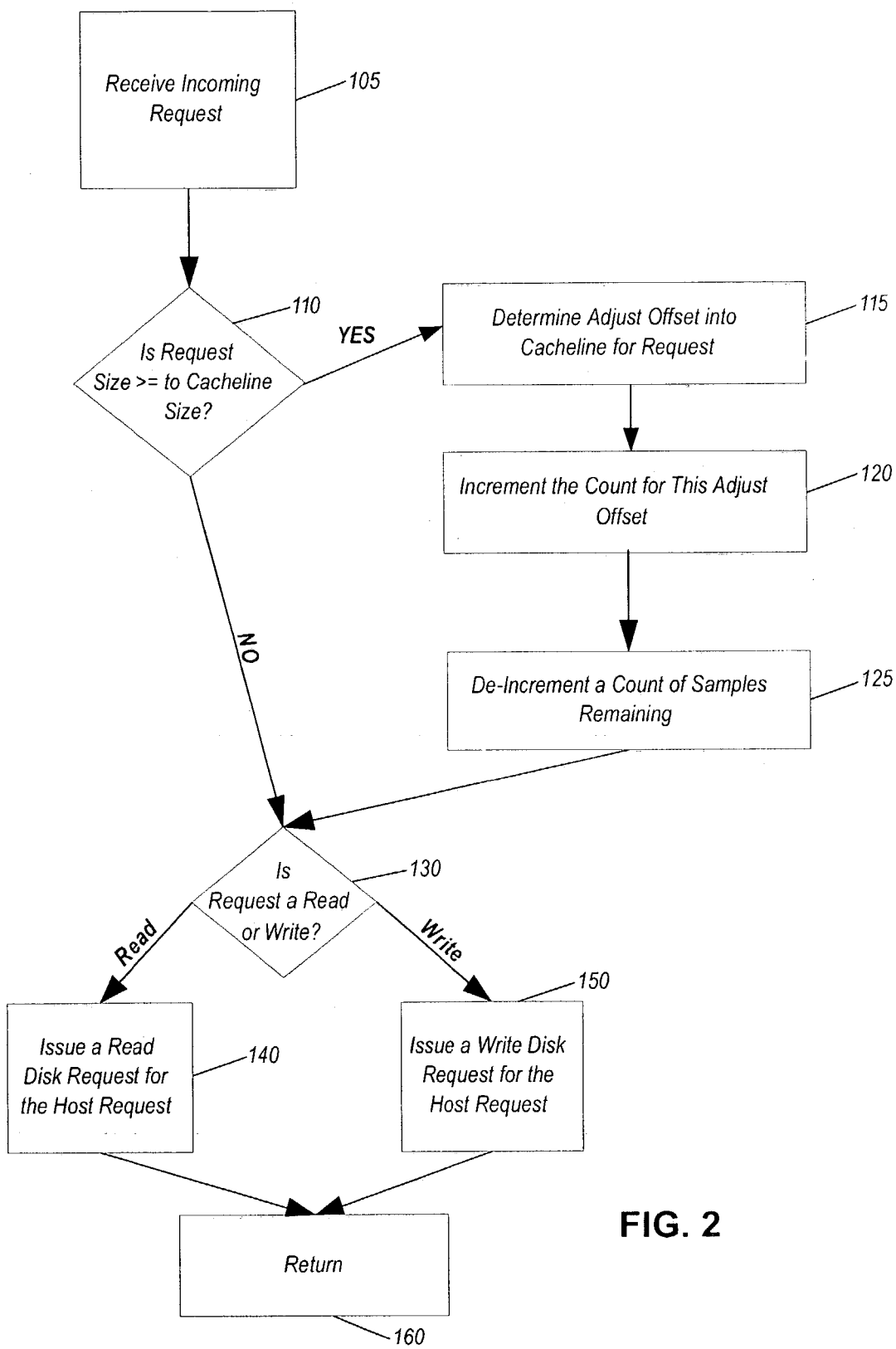
FIG. 2 is a flow diagram of an observation method in accordance with one embodiment of the present invention.

Referring now to FIG. 2, shown is a flow diagram of an observation method in accordance with one embodiment of the present invention. As shown in FIG. 2, an observation method may begin by receiving an incoming request (block 105). In one embodiment such an incoming request may be received via a disk cache driver. It may then be determined whether the disk request is for a size of disk space greater than or equal to a cacheline size (diamond 110). If so, in one embodiment an offset of the disk request into the cacheline may be determined (block 115). In one embodiment such a determination may be performed by masking a start logical block address (LBA) of the disk request with a number of sectors in a cacheline minus 1. In such manner an adjust offset for the cacheline may be determined. Next, a count for this adjust offset may be incremented in the offset array (block 120). For example, the value may be used as an index into an array entitled CachelineAdjustArray to increment the count for the particular adjust offset. Then a remaining count of disk request samples to be taken may be de-incremented (block 125).

As shown in FIG. 2, next (or if the disk request was for less than the cacheline size), it may be determined whether the disk request is a write or read operation (diamond 130). If it is a read operation, a read disk request may be issued for the host request (block 140). Alternately if it is a write request, a write disk request may be issued for the host request (block 150). Finally the method may return control (block 160), for example, to normal system flow of the OS that issued the disk request.

Figure 3:
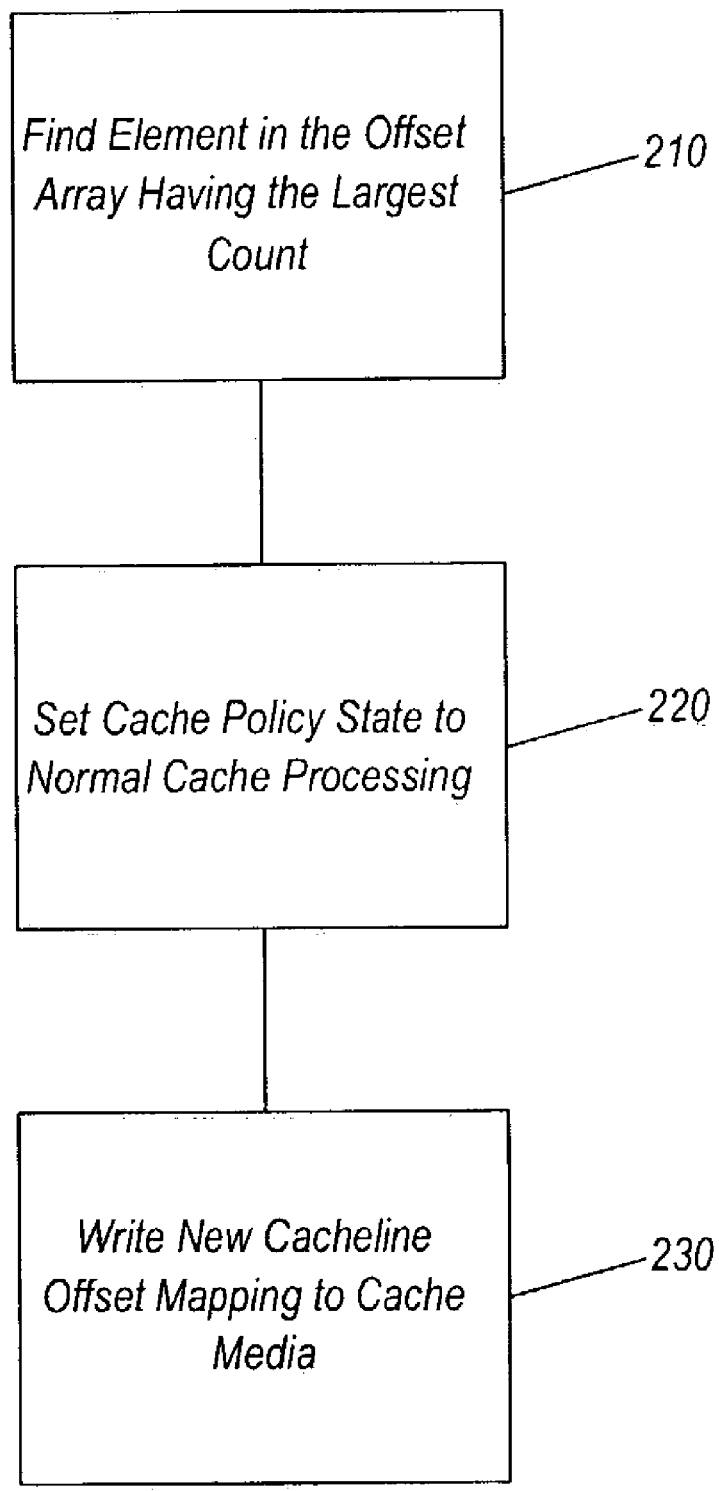
FIG. 3 is a flow diagram of a mapping determination in accordance with one embodiment of the present invention.

Referring now to FIG. 3, shown is a flow diagram of a mapping determination in accordance with one embodiment of the present invention. As shown in FIG. 3, a cacheline offset may be determined by finding the index of the element in the CachelineAdjustArray that has the largest count or occurrence (block 210). Next the cache policy state may be set back to normal cache processing (block 220). Finally, the new cacheline offset mapping may be written to the cache media (block 230).

Since the access time for each wordline is fixed, minimizing the number of wordline accesses per request in accordance with an embodiment of the present invention thus may significantly improve performance of a cache. Embodiments of the present invention may provide an adaptive process to minimize wordline accesses per request.

Embodiments may be implemented in a computer program. As such, these embodiments may be stored on a storage medium having stored thereon instructions which can be used to program a computer system, wireless device or the like to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, polymer ferroelectric random access memories (PFRAMs), or any type of media suitable for storing electronic instructions. Similarly, embodiments may be implemented as software modules executed by a programmable control device, such as a computer processor or a custom designed state machine.

Figure 4:
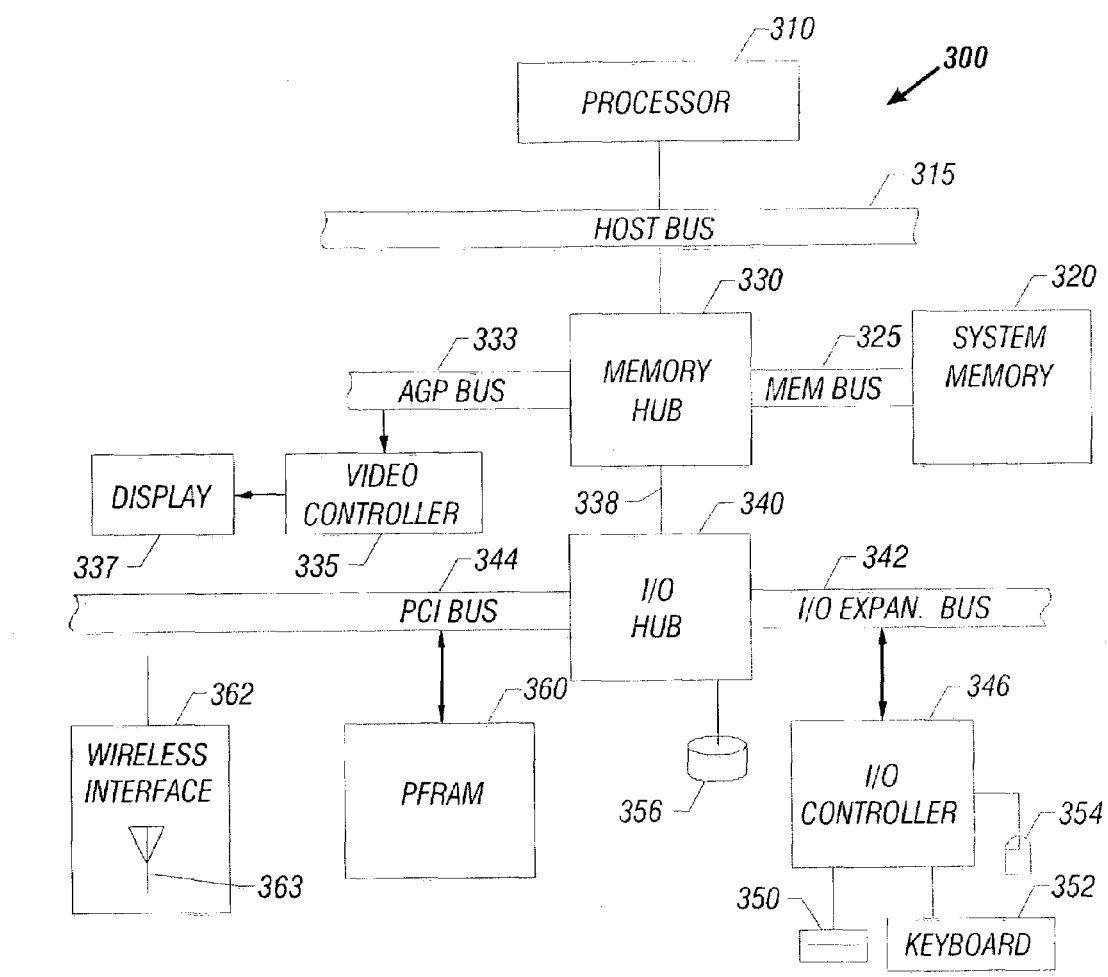
FIG. 4 is a block diagram of a representative data processing system with which embodiments of the present invention may be used.

FIG. 4 is a block diagram of a representative data processing system, namely computer system 300 with which embodiments of the invention may be used. In one embodiment, computer system 300 includes a processor 310, which may include a general-purpose or special-purpose processor such as a microprocessor, microcontroller, application specific integrated circuit (ASIC), a programmable gate array (PGA), and the like.

The processor 310 may be coupled over a host bus 315 to a memory hub 330 in one embodiment, which may be coupled to a system memory 320 via a memory bus 325. The memory hub 330 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 330 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Verslon, Revision 2.1 dated in June 1995, or alternately a bus such as the PCI Express bus, or another third generation I/O interconnect bus. The I/O expansion bus 342 may be coupled to an I/O controller 346 that controls access to one or more I/O devices. As shown in FIG. 4, these devices may include in one embodiment storage devices, such as a floppy disk drive 350 and input devices, such as keyboard 352 and mouse 354. The I/O hub 340 may also be coupled to, for example, a hard disk drive 356 as shown in FIG. 4. It is to be understood that other storage media may also be included in the system. In an alternate embodiment, the I/O controller 346 may be integrated into the I/O hub 340, as may other control functions.

The PCI bus 344 may be coupled to various components including, for example, a PFRAM 360. In embodiments of the present invention, PFRAM 360 may be a disk cache and may be optimized in accordance with an embodiment of the present invention. While shown as being coupled to PCI bus 344, in other embodiments PFRAM 362 may be coupled to various other buses such as an Integrated Drive Electronics (TDE) bus, an Advanced Technology Attachment (ATA) bus, a Small Computer Systems Interface (SCSI) bus or other system buses. Alternately PFRAM 362 may be coupled via a custom interface to memory hub 330 or I/O hub 340, or coupled to host bus 315. More so, in certain embodiments PFRAM 360 may be housed within disk drive 356.

Further shown in FIG. 4 is a wireless interface 362 coupled to the PCT bus 344, which may be used in certain embodiments to communicate with other devices. As shown in FIG. 4, wireless interface 362 may include a dipole or other antenna 363 (along with other components not shown in FIG. 4).

Although the description makes reference to specific components of the system 300, it is contemplated that numerous modifications and variations of the described and illustrated embodiments may be possible. More so, while FIG. 4 shows a block diagram of a system such as a personal computer, it is to be understood that embodiments of the present invention may be implemented in a wireless device such as a cellular phone, personal digital assistant (PDA) or the like. In such embodiments, a flash memory or PFRAM may be optimally mapped to align memory requests to wordline boundaries of the flash memory or PFRAM. In such embodiments, the flash memory or PFRAM may be coupled to an internal bus which is in turn coupled to a microprocessor and a peripheral bus, which may in turn be coupled to a wireless interface and an associated antenna such as a dipole antenna, helical antenna, global system for mobile communication (GSM) antenna, and the like.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
observing a plurality of disk requests for a drive associated with a non-volatile memory device; and
mapping the non-volatile memory device after observing the plurality of disk requests so that a wordline offset having a highest observed frequency of occurrence of the plurality of disk requests is aligned to a wordline boundary of the non-volatile memory device.

2. The method of claim 1, further comprising issuing the disk requests to the drive after observing the disk requests.

3. The method of claim 1, wherein the non-volatile memory device comprises a disk cache having a no cache policy while observing the disk requests.

4. The method of claim 1, wherein observing the disk requests comprises identifying an offset into a wordline of the non-volatile memory device for each of the disk requests.

5. The method of claim 4, further comprising incrementing a count in an offset array based on the offset identified for each of the disk requests.

6. A method comprising:
observing disk requests for a drive associated with a memory device by identifying an offset into a wordline of the memory device for each of the disk requests;
incrementing a count corresponding to the offset identified for each of the disk requests in an offset array; and
mapping the memory device based on observing the disk requests by setting an offset for the memory device corresponding to a value of the offset array having a highest frequency for the disk requests.

7. The method of claim 6, further comprising resetting the offset if a pattern of disk requests changes.

8. The method of claim 6, wherein mapping the memory device comprises a disk address to wordline offset mapping to reduce cycles of the memory device to process data requests.

9. The method of claim 6, wherein mapping the memory device comprises aligning the disk requests to a wordline boundary of the memory device.

10. A method comprising:
observing a plurality of operating system disk requests to identify a wordline offset corresponding to a greatest number of the plurality of the operating system disk requests; and
mapping a disk cache to align disk requests to a wordline boundary of the disk cache.

11. The method of claim 10, wherein the disk requests comprise disk requests for a drive associated with the disk cache.

12. The method of claim 10, further comprising mapping the disk cache using the wordline offset.

13. The method of claim 12, further comprising remapping the disk cache if a pattern of disk requests changes.

14. The method of claim 10, further comprising initializing the disk cache to clear cache mapping information and set a no caching policy before mapping the disk cache.

15. A system comprising:
at least one storage device to store code to map a memory device to align memory requests to a boundary of a wordline of the memory device, based upon a determination of a highest observed frequency of occurrence of wordline offsets of a plurality of memory requests; and
a dipole antenna coupled to the at least one storage device.

16. The system of claim 15, further comprising an offset array coupled to the at least one storage device to store counts for different observed wordline offsets.

17. The system of claim 15, wherein the memory device comprises a disk cache for a disk drive coupled to the memory device.

18. The system of claim 15, wherein the memory device comprises a polymer ferroelectric memory.

19. An article comprising a machine-readable storage medium containing instructions that if executed enable a system to:
observe a plurality of disk requests for a drive associated with a memory device; and
map the memory device after the plurality of disks requests are observed so that a wordline offset having a highest observed frequency of occurrence of the plurality of disk requests is aligned to a wordline boundary of the memory device.

20. The article of claim 19, further comprising instructions that if executed enable the system to issue the plurality of disk requests to the drive.

21. The article of claim 19, further comprising instructions that if executed enable the system to identify an offset into the wordline of the memory device for each of the plurality of disk requests.

22. The article of claim 19, further comprising instructions that if executed enable the system to remap the memory device if a pattern of average disk requests changes after mapping the memory device.

* * * * *